3,143,503
FILTER LEAF SUPPORT STRUCTURE
Irving Schmidt, New City, and Jay F. Taylor, Brooklyn,
N.Y., assignors to Multi-Metal Wire Cloth Company,
Inc., Bronx, N.Y., a corporation of New York
Filed May 26, 1961, Ser. No. 112,819
4 Claims. (Cl. 210—461)

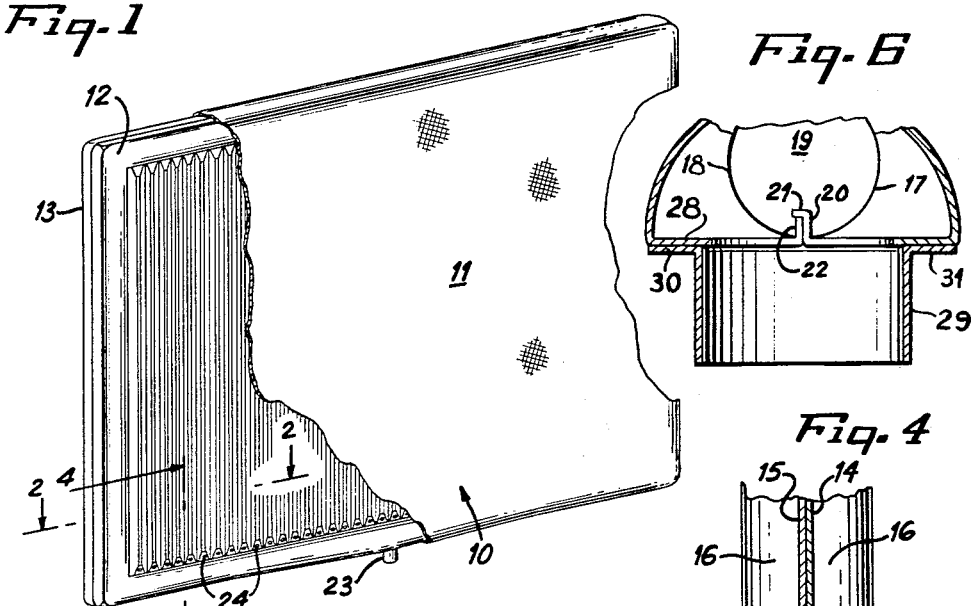
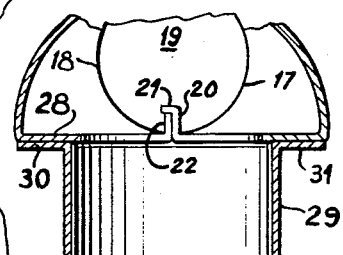
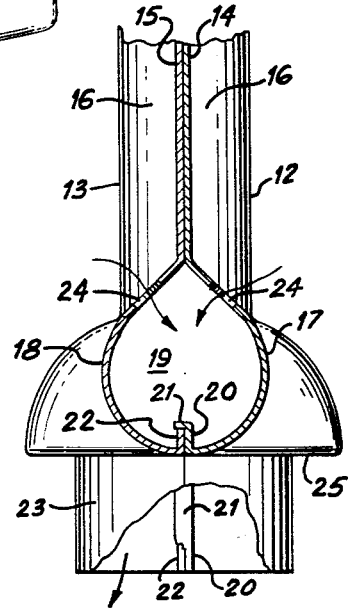
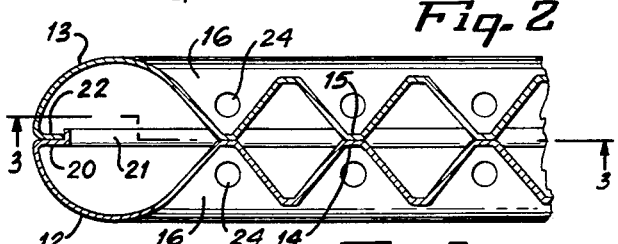
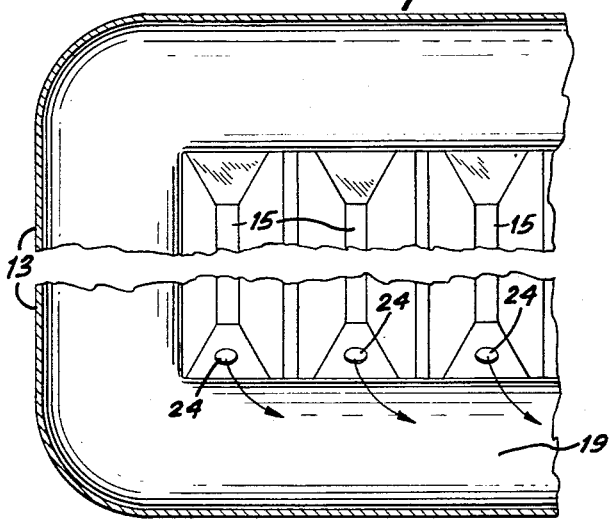
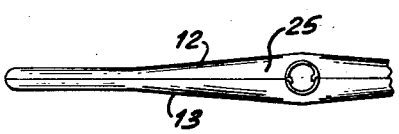
INVENTORS:
IRVING SCHMIDT
JAY F. TAYLOR
BY
ATTORNEY United States Patent Office 3,143,503
Patented Aug. 4, 1964

This invention relates generally to filtration, and has particular reference to improvements in a filter leaf of the type in which a rigid support is sandwiched between filtering septa.

In a filter leaf of the character referred to, the rigidifying support structure is hollow, communicating with an outlet pipe for filtered liquid. The filter leaf, either alone or along with other leaves of similar character, is immersed within the liquid to be filtered, and either by pressure or vacuum a flow is induced whereby the liquid passes inwardly through the filtering septa, and into and through the hollow intermediate support. As a result, a filter cake is built up on the exterior of the filter leaf, and the filtrate is drawn off through the outlet pipe.

It is a general object of this invention to provide a new and improved support structure for a filter leaf of this kind, whereby substantial economies are attainable, both in manufacture and in installation costs. The improved support is composed in a novel manner of plastic material. It is unusually light in weight, yet adequately strong and stiff, it can be readily manufactured at low cost, it is easily transportable and simple to handle and install. It is primarily intended for use with swimming pools, and is admirably suited for installations made by swimming pool contractors adjacent to the site of the pool.

Among the characterizing advantageous features of the new filter leaf support is its ruggedness and wear resistance, especially its resistance to chlorine and sunlight. The support is so designed that it can be made of two simple moldings, substantially identical, arranged in opposed relationship and cemented or otherwise secured together. In some instances, however, it may be desirable to employ a third molding in conjuction with the two substantially identical moldings. The moldings are preferably vacuum-formed, and the material employed is preferably a high-impact plastic such as styrene.

Briefly stated, the improved support structure consists of opposed walls of corrugated character, the peaks of one set of corrugations being secured in face-to-face relation to the peaks of the other, the corrugations being arranged vertically to define vertical channels underlying each filtering septum. The opposed walls are provided at the bottom with a horizontal filtrate-collecting conduit or passageway, and at the lower ends of the vertical channels there are openings which permit flow of filtrate into the collecting conduit.

A preferred way of achieving these general objectives and advantages, and such other benefits as may hereinafter be pointed out, is illustrated in the accompanying drawings, in which:

FIG. 1 is a perspective view of a filter leaf constructed in accordance with the present invention, part of the filtering septum being broken away to reveal the improved support;

FIG. 2 is an enlarged fragmentary cross-sectional view substantially along the line 2—2 of FIG. 1;

FIG. 3 is a cross-sectional view substantially along the line 3—3 of FIG. 2;

FIG. 4 is a fragmentary enlarged cross-sectional view substantially along the line 4—4 of FIG. 1;

FIG. 5 is a bottom view, partly broken away, of the rigidifying support; and

FIG. 6 is a vertical cross-sectional view through the drain opening of the filter leaf showing an alternative construction.

The filter leaf chosen for illustration is substantially rectangular in contour, but the particular shape shown is not essential, as will be understood. Suitably mounted, in known fashion, upon opposite exposed faces of the support structure 10, are filtering sheets or septa, one of which is shown at 11. The filtering septum may be of any desired character, such as a fabric of nylon or other cloth, or a porous sheet of woven metal or other suitable material. The filtering septum is mounted in tensioned condition, so that when the filter leaf is immersed in the liquid to be filtered, a flow inwardly through the filtering septum will deposit solids on the exterior surface.

The structural nature of the support 10 is best shown in FIG. 2, in which it will be noted that a unitary molded plastic element 12 constitutes one wall of the structure, and a substantially identical molded element 13 constitutes the other wall. Each of these elements is of corrugated nature, and the inwardly directed peaks 14 of the wall 12 are in face-to-face relation to the corresponding inwardly directed peaks 15 of the wall 13. This defines a series of parallel vertical channels along each outer face of the supporting device 10.

The bottom margin of the wall 12 is of U-shaped cross-section, as shown at 17 (see FIG. 4). The bottom margin of the wall 13 is similarly shaped, as shown at 18. These margins are arranged in opposed relation to define a filtrate-collecting conduit 19 between them. The side and top margins may be similarly U-shaped, for ease of manufacture and assembly and for rigidifying the support structure, but only the passageway 19 along the bottom is of primary importance so far as flow of filtrate is concerned. Furthermore, the smooth rounded edges of the structure provided by the U-shaped contour of the margins serve to support the fabric septum without undue stress where the latter is in the form of a bag which fits over the entire support structure as shown in FIG. 1.

During the molding of each of the walls, the marginal edges are provided with an inturned flange 20 (see FIG. 4) terminating in an upturned rim 21. When two of the molded wall sections are to be brought together to form the support structure 10, the rim 21 is eliminated from one of them. In the device shown, this rim has been eliminated from the flange 22 formed on the marginal edge of the molded element 13. As a result, the molded sections can be brought together in opposed relationship with the flanges 20, 22 in flatwise contacting relation, and with the rim 21 engaging the edge of the flange 22. This engagement facilitates the accurate positioning of the two molded elements with respect to each other, and it adds rigidity and stability to the entire structure. The molded elements are secured together in this relationship either by adhesive means or its equivalent. Securement by means of adhesive is the simplest procedure, and has been found entirely satisfactory in commercial practice.

Leading from the horizontal passageway 19, preferably at the center, is a nipple 23 constituting a drain opening. Any suitable or desired type of flexible or non-flexible pipe can be connected to this drain outlet. The nipple 23, in the embodiment of FIGS. 1–5, is formed in two halves, each being an integral part of the corresponding one of the moldings 12, 13. The flanges 20, 22 extend along the marginal edges of each semi-cylindrical part, as shown in FIG. 4.

Formed in each of the walls 12 and 13, at the lower ends of the vertical channels 16, are openings 24. These openings establish flow passages between the lower ends of the channels 16 and the conduit 19, as indicated by the arrows in FIGS. 3 and 4.

In order that the outlet nipple 23 may be of larger size, it may be desirable to alter the contours of the marginal parts 17 and 18 in the region of the outlet 23, so that the conduit 19 flares outwardly in the direction of the outlet, and so that a relatively flat surface 25 (see FIG. 5) is formed in the immediate region of the outlet connection. The flat surface 25 serves as a support for a gasket which is used when the water-tight connection is made between the filter leaf and an outlet pipe.

Filter leaves constructed in accordance with this invention may be of any desired size, and a rectangle having dimensions of the order of three or four feet along each edge is not impractical, since the plastic material is of such light weight. This makes it a relatively simple matter for the swimming pool contractor to install one or more of the filter leaves within a prearranged excavation adjacent to the pool and in communication with it. Each filter leaf is connected at the outlet 23 to a pipe or manifold (not shown) leading to a vacuum pump. Each filter leaf being immersed in the water to be filtered, the vacuum pump induces a flow into and through each hollow support element, the clarified filtrate being then returned to the pool. Thus each filter leaf is never subjected to any greater pressure than atmospheric pressure, and it is a relatively simple matter to scrape or brush away collected solid materials, at periodic intervals. Also, should it ever become necessary to withdraw one of the filter leaves, for inspection or replacement, it is a relatively easy matter to disconnect it in the region 23 and withdraw it bodily from the installation.

FIG. 6 shows an alternative embodiment of the support in which the two halves forming the nipple 23 are not formed integrally with the moldings 12 and 13. In this case, the moldings terminate at the drain opening in an annular lip 28. Secured to the lip 28, as by adhesive, is an independently molded nipple 29 having a flange 30. The surface 31 of the flange serves as a gasket support similar to the surface 25 described above. In certain situations, the construction of FIG. 6 has been found to have structural advantages over the construction of FIGS. 1–5.

Many of the details herein described and illustrated may obviously be modified by those skilled in the art without necessarily departing from the spirit and the scope of the invention as expressed in the appended claims.

What is claimed is:

1. In a filter leaf of the type in which a rigid support is sandwiched between filtering septa, a support structure consisting essentially of a pair of sheets of plastic material each formed to define a corrugated filter leaf wall peripherally surrounded by a U-shaped marginal portion, said sheets being bonded together with the peaks of the corrugation and the edges of the marginal portions of one sheet secured in face to face relation to the peaks of the corrugations and edges of the marginal portions of the other sheet, the corrugations of the united sheets being arranged vertically to define a set of vertical channels underlying each septum, and the U-shaped marginal portions of the united sheets forming a strengthening and rigidifying tubular border about the periphery of the leaf, the tubular border at the bottom margin of the leaf defining a horizontal filtrate-collecting conduit, said walls having openings establishing flow passages between the lower ends of said channels and the interior of said conduit, and a drain connected to said conduit.

2. A filter leaf support structure as defined in claim 1, the outer edges of the U-shaped marginal portions of the walls being provided with flanges extending inwardly in the plane of the leaf and secured flatwise against each other.

3. A filter leaf support structure as defined in claim 2, one of said flanges having an upturned rim engaging the edge of the opposed flange.

4. In a filter leaf of the type in which a rigid support is sandwiched between filtering septa, a support structure consisting essentially of a pair of sheets of plastic material each formed to define a corrugated filter leaf wall peripherally surrounded by a U-shaped marginal portion, said sheets being bonded together with the peaks of the corrugation and the edges of the marginal portions of one sheet secured in face to face relation to the peaks of the corrugations and edges of the marginal portions of the other sheet, the corrugations of the united sheets being arranged vertically to define a set of vertical channels underlying each septum, and the U-shaped marginal portion of the united sheets forming a strengthening and rigidifying tubular border about the periphery of the leaf, the tubular border at the bottom margin of the leaf defining a horizontal filtrate-collecting conduit, said corrugated faces of the leaf being imperforate except for the provision of holes at the lower end of said channels through which said channels communicate with the interior of said conduit, each of said vertical channels receiving filtrate along its entire length and discharging said filtrate through an opening in the lower end of each channel, said opening communicating with the interior of said conduit, whereby filtrate after it passes through the septa is constrained to flow vertically downwardly along the exterior faces of said plate until it reaches the lower ends of said vertical channels whereupon it enters said filtrate-collecting conduit.

References Cited in the file of this patent

UNITED STATES PATENTS

| | | |
|---|---|---|
| 1,965,999 | Beatty | July 10, 1934 |
| 2,582,311 | Creswick et al. | Jan. 15, 1952 |
| 2,639,251 | Kracklauer | May 19, 1953 |
| 2,754,004 | D'Urso | July 10, 1956 |
| 3,019,905 | Baker et al. | Feb. 6, 1962 |

FOREIGN PATENTS

| | | |
|---|---|---|
| 450,631 | Canada | Aug. 24, 1948 |
| 497,204 | Great Britain | Dec. 14, 1938 |